Oct. 4, 1932.   C. STANSBURY ET AL   1,880,367

CIRCUIT CONTROLLER

Filed Nov. 19, 1930

Inventors
Carroll Stansbury
Prescott Crout
By Franklin Hubbard
Attorney

Patented Oct. 4, 1932

1,880,367

UNITED STATES PATENT OFFICE

CARROLL STANSBURY, OF WAUWATOSA, WISCONSIN, AND PRESCOTT CROUT, OF SCHENECTADY, NEW YORK, ASSIGNORS TO CUTLER-HAMMER, INC., OF MILWAUKEE, WISCONSIN, A CORPORATION OF DELAWARE

CIRCUIT CONTROLLER

Application filed November 19, 1930. Serial No. 496,636.

This invention relates to circuit controllers.

Circuit controllers embodying the invention may be advantageously used in various relations, and particularly in connection with motor driven apparatus for the performance of various functions, as for instance to provide high torque starting of a motor and torque reduction thereof after it has started, or to provide for locking of a part of the driven machine when it has been started by the motor, and the release of such part after the machine has stopped.

An object of the invention is to provide a controller for the aforementioned and other purposes wherein the desired circuit commutations are affected by the control of electronic discharges.

Another object is to render the electronic discharges dependent for the desired control thereof upon starting and stopping of the motor or the like.

Another object is to provide for the control of a circuit in response to the operation of a motor.

Other objects and advantages will hereinafter appear.

The accompanying drawing is illustrative of certain embodiments of the invention, it being obvious that such embodiments are capable of many modifications all within the scope of the invention as covered by the description and appended claims.

Figure 1:
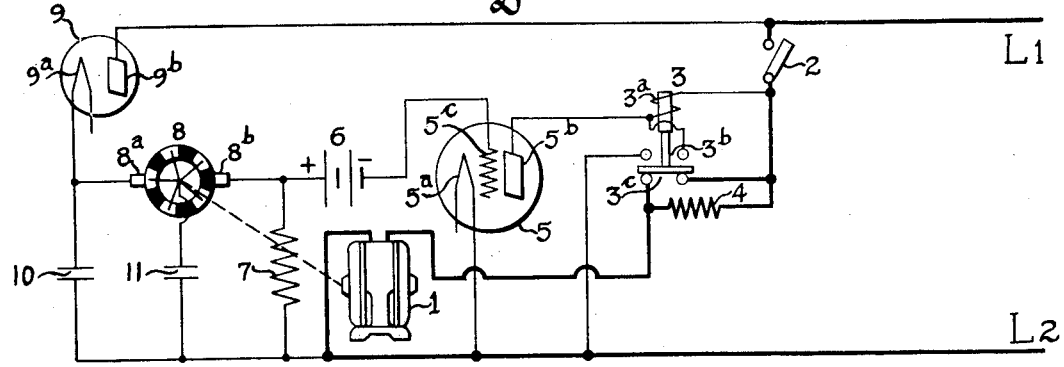
Figure 1 illustrates the invention as employed to control an alternating current motor.

Referring to Fig. 1, the alternating current supply lines $L^1$ and $L^2$ furnish power for operation of a motor 1. A switch 2 connects one terminal of the motor winding to line $L^1$, while the other terminal is directly connected to line $L^2$. An electromagnetic switch 3 has a winding $3^a$, normally open contacts $3^b$ and normally closed contacts $3^c$ shunting a resistance 4 in circuit with the motor. The winding $3^a$ is connected in series with an electron tube 5, having a cathode $5^a$, an anode $5^b$ and a grid $5^c$. The cathode may be of the heated type and heated in any well known manner. A battery 6 has its negative terminal connected to the grid $5^c$, while its positive terminal connects through a discharge resistance 7 to the line $L^2$. On the shaft of the motor is mounted a commutator 8, which alternately makes contact with the stationary brushes $8^a$ and $8^b$. The brush $8^b$ is connected to the positive pole of battery 6, while brush $8^a$ is connected to the cathode $9^a$ of an electron tube or other type of rectifier 9, whose anode $9^b$ is connected to line $L^1$. A condenser 10 is interposed between the cathode $9^a$ and the line $L^2$ and another smaller condenser 11 between the commutator 8 and line $L^2$.

The controller functions as follows:

When the lines $L^1$ and $L^2$ are energized a unidirectional pulsating current flows through the rectifier 9 and charges the condenser 10 so that its plate connected to brush $8^a$ has a positive potential. If the brush touches a commutator segment, the condenser 11 is also charged, as it is then in parallel to condenser 10.

If it is desired to start the motor, the switch 2 is closed, whereupon the motor circuit is completed through contact $3^c$. As the resistance 4 is short-circuited the starting torque of the motor is high and the motor is capable of starting its load. No current can flow through winding $3^a$ and tube 5 because the grid $5^c$ of the latter has a potential which is negative with respect to the cathode $5^a$ due to the voltage impressed thereon by the battery 6. If, at the moment of starting, the brush $8^b$ makes contact with a segment of the commutator 8, the condenser 11 has no charge because any previous charge has leaked off through the resistance 7. If, at the moment of starting, the brush $8^a$ is in contact with a segment of the commutator 8, both the condenser 10 and the condenser 11 have a positive charge on their plates connected to the commutator 8. As soon as the motor starts the commutator revolves and breaks the contact with the brush 8ª and makes contact with brush 8ᵇ. The positive potential of the condenser 11 is thereupon superposed upon the negative potential impressed upon the grid 5ᶜ by the battery 6, so that the resulting potential of the grid is sufficiently high to permit a current to flow through the tube 5 and thus energize the magnet switch 3. It should be noted that the resistance 7 is relatively high, so that the initial discharge through said resistance does not seriously reduce the initial potential impressed upon the grid 5ᶜ. When the magnetic switch 3 is energized it closes its normally open contact 3ᵇ and opens its normally closed contacts 3ᶜ. The opening of the latter inserts the resistance 4 into the motor circuit, thus limiting its running torque and speed, while the closing of the contacts 3ᵇ connects the coil 3ª directly across the line and makes its functioning independent of the tube 5 so that it will remain in the energized position until the switch 2 is again opened.

Figure 2:
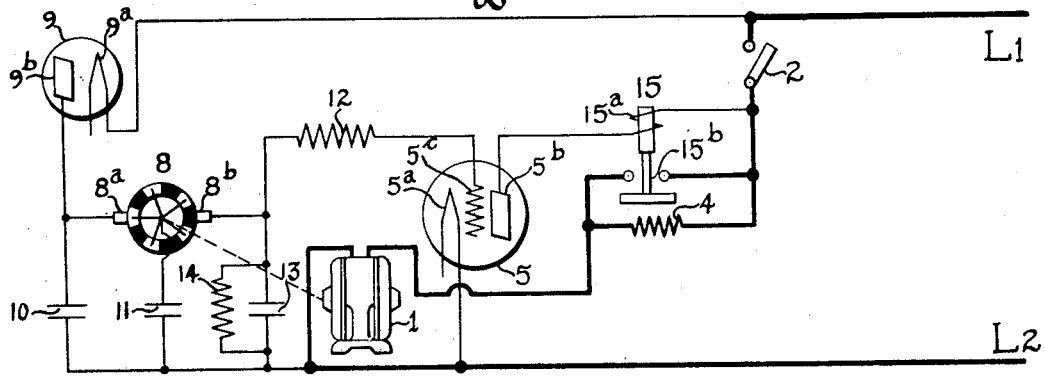
Fig. 2 illustrates a modification of the system of Fig. 1.

In Fig. 2 the battery 6 has been omitted and a resistance 12 substituted therefor. In series with the resistance 12 and connected between the latter and the line L² is a condenser 13 which is paralleled by a discharge resistance 14. The terminals of the rectifier 9 are reversed with respect to the lines L¹ and the condenser 10; that is the cathode 9ª is connected to line L¹ and the anode 9ᵇ is connected to condenser 10. The electromagnetic switch 3 of Fig. 1 is replaced by an electromagnetic switch 15 having a winding 15ª and normally open contacts 15ᵇ, which latter are adapted when closed to short-circuit the regulating resistance 4 in the motor circuit. When the switch 2 is closed a current flows from line L¹ through the winding 15ª and the electron tube 5 to line L², the grid 5ᶜ having the same potential as the cathode 5ª, so that it is not capable of preventing a flow of current during the half cycle when the line L² is negative. As the motor revolves the brushes 8ª and 8ᵇ make alternately intermittent contact with the segments of the commutator. While brush 8ª makes contact it charges the plate of the condenser 11 which is connected to the commutator to a potential negative with respect to the cathode 5ᶜ. When at the next moment the brush 8ᵇ makes contact with the commutator the charge of the condenser 11 is transferred to the condenser 13 and a negative potential is impressed upon the grid 5ᶜ, the value of this potential depending upon the charge of the condenser 11, the capacity of condenser 13 and the resistance 14. This negative potential is of such a value as to prevent current flow during succeeding positive half cycles, thereby causing the relay 15 to become deenergized and to open its contact and re-insert the resistance 4 into the motor circuit.

The negative charge of the grid 5ᶜ tends to leak off gradually through the resistance 14, but is periodically restored to its maximum value, as the commutator is revolving while the motor is running, with the result that the relay 15 remains deenergized and retains the resistance 4 in the motor circuit. On the other hand, as soon as the motor comes to rest, no more charges are transferred from the condenser 11 to the grid and the charge of the latter and the condenser 13 gradually leaks off through the resistance 14, so that upon subsequent reconnection of the motor the tube 5 is rendered temporarily conducting to control resistance 4 in the aforedescribed manner.

Figure 3:
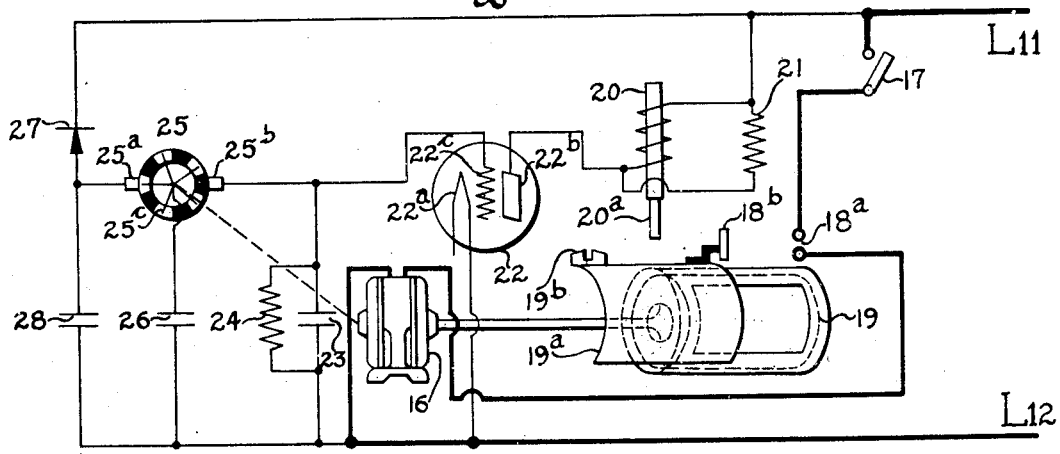
Fig. 3 illustrates the invention as applied to the control of a latch on a machine, whereby access to the machine by the attendant is prevented while the machine is running.

In Fig. 3 a motor 16 is connected to the alternating current lines L¹¹ and L¹² in series with a manual switch 17 and the stationary contacts 18ª of a switch 18. The motor drives a rotating drum 19 of an electroplating machine. The drum is protected by a housing having a sliding cover 19ª, which latter is equipped with a boss 19ᵇ, engaging the plunger 20ª of an electromagnet 20 when the cover is in the closed position and the electromagnet is deenergized. A contact plate 18ᵇ is mounted on the cover 19ª in such a manner as to bridge the stationary contacts 18ª when the cover is closed. The energizing winding of magnet 20 is paralleled by a resistance 21. One terminal of the winding of magnet 20 is connected to line L¹¹, while the other terminal is connected to an anode 22ᵇ of an electronic tube 22, having a cathode 22ª connected to the line L¹², and a grid 22ᶜ. The grid 22ᶜ is connected in series with a condenser 23 to line L¹² and the condenser is shunted by a discharge resistance 24.

Connected to the shaft of the drum 19 is a commutator 25, having stationary brushes 25ª and 25ᵇ and rotating contact segments 25ᶜ. The brushes 25ª and 25ᵇ are so arranged that they alternately make contact with the segments 25ᶜ. A condenser 26 connects the segments 25ᶜ to line L¹². The brush 25ᵇ is connected to the grid 22ᶜ. A rectifier 27, which may be of any well known type, has its cathode connected to line L¹¹ while its anode is connected both to the brush 25ª and to one plate of a condenser 28 whose other plate is connected to line L¹².

The system illustrated in Fig. 3 operates as follows:

To start the motor the switch 17 is closed and the sliding door 19ª is moved to the right, so that contact 18ᵇ bridges the stationary contacts 18ª and closes the motor circuit, whereupon the drum 19 is rotated and brought up to speed.

The rectifier 27 continuously impresses a charge upon the plate of the condenser 28, the potential of which is negative with respect to the cathode 22ª. As soon as the brush 25ª makes contact with one of the segments 25ᶜ this charge is partially transferred to the condenser 26 and upon further rotation one of the segments makes contact with brush 25$^b$ and thereby causes a negative potential to be impressed upon grid 22$^c$, which potential prevents the tube 22 from conducting current to energize the magnet 20.

The magnet 20 is energized when the motor is connected to the line, as at such time the grid 22$^c$ has the potential of the cathode 22$^a$ and is thus incapable of preventing current flow to the magnet. However, as soon as the motor starts the aforedescribed action takes place and the magnet is deenergized, with the result that the plunger 20$^a$ engages the boss 19$^b$ and prevents opening of the machine housing while the motor is running.

If the switch 17 is opened the motor comes to rest and the charge of the grid circuit is not any more renewed in the manner described. The charging current leaks off through the resistance 24 until finally the grid potential cannot prevent the current from flowing through tube 22 and magnet 20. The magnet thereupon attracts the plunger 20$^a$ and releases it from engagement with boss 19$^b$, thus permitting opening of the machine housing.

The resistance 21 in parallel with the magnet coil has the purpose of delaying the rise of current in the coil when the tube becomes conductive, thus further delaying release of the cover 19$^a$. It also provides for smoothing out the current pulsations in the magnet coil in a well known manner. However, this resistance may be omitted without affecting the principle of operation of the system.

The time delay of response of the system may be varied by varying the capacity of the condensers 23 and 26, or the resistance 24.

While for the purpose of illustration the invention has been described as applied to systems employing an alternating current supply, it is clear that it is equally applicable to direct current supply. Other modifications obvious to those skilled in the art may be made without departure from the spirit of these specifications and coming within the scope of the appended claims.

What we claim as new and desire to secure by Letters Patent is:

1. In combination, a motor, an electroresponsive controlling instrumentality and control means therefor, including an electron tube connected in circuit with a winding of said instrumentality, said control means further including an energy storage circuit, and means dependent upon starting of the motor to supply a transient potential to said energy storage circuit, to effect discharge of said circuit and to impress the resultant transient potential upon an element of said tube.

2. In combination, a motor, an electroresponsive controlling instrumentality and control means therefor including an electron tube connected in circuit with a winding of said instrumentality, said control means further including two energy storage circuits and commutating means dependent upon starting of the motor to impress a periodic potential upon one of said storage circuits to effect discharge of the latter into the other storage circuit, and to impress the resultant transient potential upon an element of said tube.

3. In combination, a motor, an electroresponsive controlling instrumentality and control means therefor including an electron tube connected in circuit with a winding of said instrumentality, an energy storage circuit, and means for impressing a biasing voltage upon an element of said tube, said control means further including means dependent upon starting of the motor to supply a periodic potential to said energy storage circuit, to effect discharge of said circuit and to impress the resultant transient potential upon said element of said tube to thereby vary its voltage bias.

4. In combination, a motor, an electroresponsive controlling instrumentality, control means therefor including an electron tube connected in circuit with a winding of said instrumentality, said control means further including two energy storage circuits and commutating means, dependent upon starting of the motor to impress a periodic potential upon one of said storage circuits, to effect discharge of the latter into the other storage circuit, and to impress the resultant transient potential upon an element of said tube, and means to discharge said other storage circuit to thereby eliminate its effect upon the tube when the motor stops.

5. In combination, a motor, an electroresponsive controlling instrumentality, control means therefor including an electron tube connected in circuit with a winding of said instrumentality, said control means further including two energy storage circuits and commutating means, dependent upon starting of the motor to impress a periodic potential upon one of said storage circuits, to effect discharge of the latter into the other storage circuit, and to impress the resultant transient potential upon an element of said tube, and means to terminate discharge of the first storage circuit when the motor stops.

6. In combination, a motor, an electroresponsive controlling instrumentality and control means therefor including an electron tube connected in circuit with a winding of said instrumentality, said control means further including two energy storage circuits, and commutating means dependent upon the starting of the motor to impress a periodic potential upon one of said storage circuits, to effect discharge of the latter into the other storage circuit, and to impress the resultant transient potential upon an element of said tube and to terminate said commutation when the motor stops.

7. In a system for controlling the torque of a motor, in combination, a motor, torque varying means for the motor and control means therefor including an electron tube and an energy storage circuit, and means dependent upon starting of the motor to supply a transient potential to said energy storage circuit and to effect discharge of said circuit and to impress the resultant transient potential upon an element of said tube, to thereby vary the torque of the motor.

8. In a system for controlling the torque of a motor, in combination, a motor, torque varying means for the motor, and control means therefor including an electron tube, an energy storage circuit and means for impressing a biasing voltage upon an element of said tube, said control means further including means dependent upon starting of the motor to supply a periodic potential to said energy storage circuit, to effect discharge of said circuit and to impress the resultant transient potential upon said element of said tube to thereby vary its voltage bias.

9. In a system for controlling the torque of a motor, in combination, a motor, torque varying means for the motor, and control means therefor including an electron tube, and two energy storage circuits, said control means further including means, dependent upon starting of the motor, to impress a periodic potential upon one of said storage circuits, to effect discharge of the latter into the other storage circuit, and to impress the resultant transient potential upon an element of said tube to thereby vary the torque of the motor.

10. In a system for controlling the torque of a motor, in combination, a motor, torque varying means for the motor, control means therefor including an electron tube, and two energy storage circuits, said control means further including commutating means, dependent upon starting of the motor, to impress a periodic potential upon one of said storage circuits, to effect discharge of the latter into the other storage circuit and to impress the resultant transient potential upon an element of said tube to thereby vary the torque of the motor, and means to discharge said other storage circuit to thereby eliminate its effect upon the tube when the motor stops.

11. In a system for controlling the torque of a motor, in combination, a motor, torque varying means for the motor, control means therefor including an electron tube and two energy storage circuits, said control means further including means, dependent upon the starting of the motor, to impress a periodic potential upon one of said storage circuits to effect discharge of the latter into the other storage circuit and to impress the resultant transient potential upon an element of said tube to thereby vary the torque of the motor, and means to terminate discharge of the first storage circuit when the motor stops.

12. In a system for controlling the torque of a motor, in combination, a motor, torque varying means for the motor, and control means therefor including an electron tube and two energy storage circuits, said control means further including commutating means, dependent upon starting of the motor, to impress a periodic potential upon one of said storage circuits, to effect discharge of the latter into the other storage circuit, and to impress the resultant transient potential upon an element of said tube, said torque varying means acting upon stopping of the motor to vary the torque adjustment.

13. In a system for controlling the torque of a motor, in combination, a motor, a current supply, an electromagnetic switch for controlling the motor circuit and affording when energized a given torque of the motor and another torque when deenergized, an electron tube in circuit with a winding of said switch and having a grid, an energy storage circuit, means for impressing a biasing voltage upon said grid and a commutator connected to be operated by the motor to supply a periodic potential to said energy storage circuit, to effect discharge of said circuit and to impress the resultant transient potential upon said grid to thereby vary its voltage bias.

14. In a system for controlling the torque of a motor, in combination, a motor, a current supply, an electromagnetic switch for controlling the motor circuit and affording a given torque of the motor when energized and another torque when deenergized, an electron tube in circuit with a winding of said switch and having a grid, two energy storage circuits and a commutator connected to be operated by the motor to supply a periodic potential to one of said storage circuits to effect discharge of the latter into the other storage circuit and to impress the resultant transient potential upon said grid to thereby vary the conductivity of said tube.

15. In a system for controlling the starting torque of a motor, in combination, a motor, a current supply, an electromagnetic switch for controlling the motor circuit and affording a given torque of the motor when energized and another torque when deenergized, an electron tube in circuit with a winding of said switch and having a grid, two energy storage circuits, a commutator to be operated by the motor to supply a periodic potential to one of said storage circuits, to effect discharge of the latter into the other storage circuit and to impress the resultant transient potential upon said grid to thereby vary the conductivity of said tube, and means to discharge the stored energy of said other storage circuit.

16. In a system for locking a part of a motor driven machine when said machine is in motion, in combination, a driving motor, an electromagnetically operated lock, an electron tube in circuit with a winding of said lock for controlling the latter and having a grid, an energy storage circuit, means for impressing a biasing voltage upon said grid and a commutator actuated by said motor and adapted when so actuated to supply periodic potential to said energy storage circuit, to effect discharge of said circuit and to impress the resultant transient potential upon said grid to thereby vary its voltage bias.

17. In a system for locking a part of a motor driven machine when said machine is in motion, in combination, a driving motor, an electromagnetically operated lock, an electron tube in circuit with a winding of said lock for controlling the latter and having a grid, two energy storage circuits and a commutator actuated by said motor and adapted when so actuated to supply a periodic potential to one of said storage circuits, to discharge the latter into the other storage circuit and to impress the resultant transient potential upon said grid to thereby control the current of said winding.

18. In a system for locking a part of a motor driven machine when said machine is in motion, in combination, a driving motor, an electromagnetically operated lock, an electron tube in circuit with a winding of said lock for controlling the latter and having a grid, two energy storage circuits, a commutator actuated by said motor and adapted when so actuated to supply a periodic potential to one of said storage circuits, to discharge the latter into the other storage circuit and to impress the resultant transient potential upon said grid to thereby control the current of said winding, and means to discharge the energy stored in said other storage circuit.

19. In a system of control for a device having a rotatable element, the combination with the rotatable element of such device, of an electro-magnetic winding and control means therefor including an electron tube connected in circuit with said winding, said control means further including an energy storage circuit and means dependent upon rotation of said element to supply a transient potential to said energy storage circuit, to effect discharge of said circuit and to impress the resultant transient potential upon an element of said tube.

20. In a system for controlling a device having a rotatable element, the combination with the rotatable element of such device, of an electro-magnetic winding and control means therefor including an electron tube connected in circuit with said winding, said control means further including two energy storage circuits and commutating means dependent upon rotation of said element to impress a periodic potential upon one of said storage circuits, to effect discharge of the latter into the other storage circuit and to impress the resultant potential upon an element of said tube.

In witness whereof, we have hereunto subscribed our names.
PRESCOTT CROUT.
CARROLL STANSBURY.